United States Patent [19]

Hammerly

[11] 3,934,901
[45] Jan. 27, 1976

[54] QUICK RELEASE MUD FLAP HANGER ASSEMBLY FOR TRUCKS AND TRAILERS

[76] Inventor: Robert C. Hammerly, 2061 Norma Lane, Anaheim, Calif. 92802

[22] Filed: Nov. 29, 1974

[21] Appl. No.: 528,347

[52] U.S. Cl. ........................................ 280/154.5 R
[51] Int. Cl.² ........................................... B62B 9/16
[58] Field of Search...... 280/154.5 R; 248/224, 204; 74/527

[56] References Cited
UNITED STATES PATENTS

| | | | |
|---|---|---|---|
| 2,952,343 | 9/1960 | Modrey | 248/224 |
| 2,970,849 | 2/1961 | Betts | 280/154.5 R |
| 3,388,884 | 6/1968 | Eggler | 280/154.5 R |
| 3,782,757 | 1/1974 | Juergens | 280/154.5 R |

Primary Examiner—Robert R. Song
Attorney, Agent, or Firm—Gausewitz, Carr & Rothenberg

[57] ABSTRACT

A quick release mud flap hanger assembly for trucks and trailers comprises an L-shaped mud flap hanger having an elongate, outwardly projecting first leg and a shorter leg depending therefrom. A mud flap is suspended from the first hanger leg, and a hanger support bracket, adapted for mounting on a truck or trailer frame, has a guideway into which the second hanger leg is downwardly received. A resilient hanger portion, having a plurality of bends, each of less than 90°, interconnects the first and second legs, vibrational flexing of the first leg relative to the second leg being divided among such plural bends to reduce work hardening and greatly extend hanger life. Portions of a spring loaded detent element provided in the second leg project outwardly below portions of the guideway when the second leg is fully received into the guideway, to prevent accidental release of the second leg. Vertical forces exerted on the first hanger leg cause portions of the guideway to depress the detent element, thereby allowing insertion or removal of the second hanger leg into or from the guideway without the necessity for an operator getting behind the vehicle's wheels or under its structure to engage or disengage the hanger. Variations in the number, location and orientation of bends in the resilient hanger portion are disclosed.

13 Claims, 8 Drawing Figures

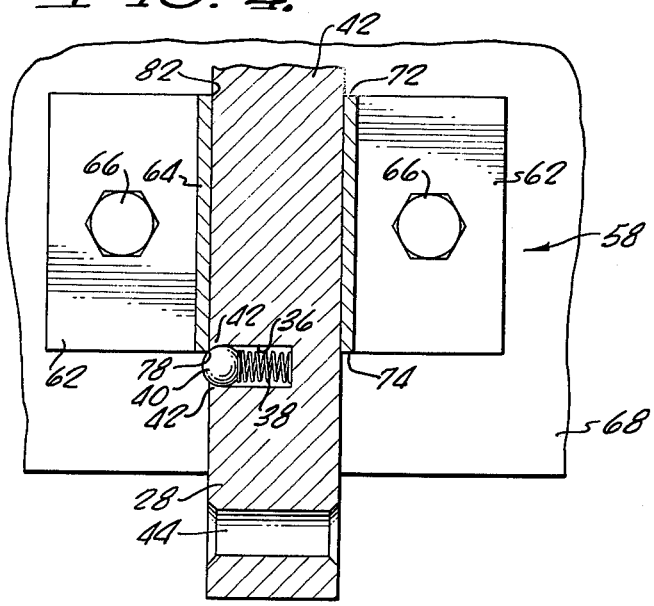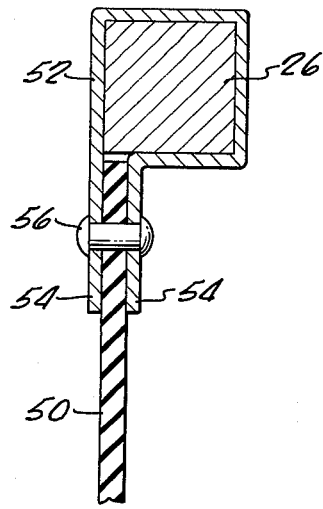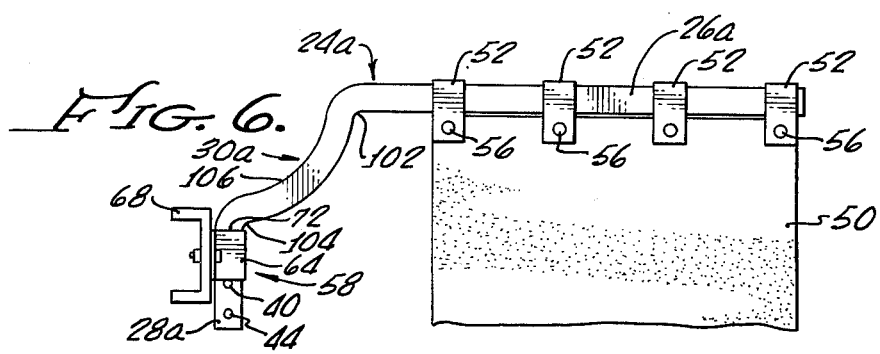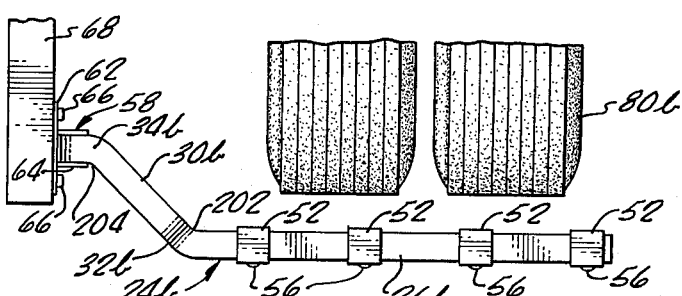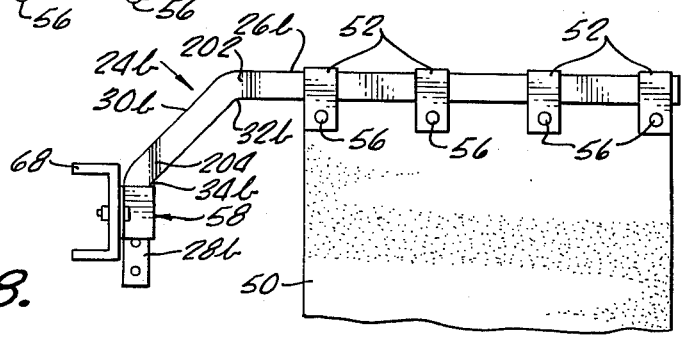

QUICK RELEASE MUD FLAP HANGER ASSEMBLY FOR TRUCKS AND TRAILERS

BACKGROUND OF THE INVENTION

1. Field of the Invention

The invention relates to mud guards for truck and trailer wheels and more particularly to removable mud flap hangers of the cantilever type for such wheels.

2. Description of the Prior Art

Virtually all vehicles operated on public highways are required by state law to be equipped with means for intercepting mud, water spray, gravel, etc., thrown rearwardly by the vehicle's wheels, the purpose being to protect following vehicles from damage and from obscured vision which could cause accidents.

Trucks and trailers may satisfy this requirement by hanging mud flaps rearwardly of exposed wheels. Depending upon the size and number of wheels, the mud flaps may be as large as two feet wide and three feet long. They are generally constructed of a comparatively thick sheet of tough, resilient material for strength and are sufficiently heavy not to sail out rearwardly at high vehicle speeds. Many types of vehicles have no structure above the exposed wheels, so it is necessary to cantilever mud flap hangers outwardly from frame members inwardly of the wheels. The mud flap hanger alone is comparatively expensive, considering the frequency of replacement, and may cost about $60 per pair.

The mud flaps and cantilevered mud flap hangers are generally in exposed locations and are subject to considerable wear and abuse. For example, when used on trucks or trailers which haul logs, rocks, gravel, etc., and which are used extensively on rough, unpaved, non-public roads, the mud flaps, unless removed, may quickly be torn by objects thrown by the wheels or by obstructions and the hangers may be bent or broken by similar means. On many types of trailer trucks, notably the so-called "fifth wheel" types where forward portions of the trailer overhang rearward portions of the truck, front underportions of the trailer may contact the hangers on the truck when the vehicle vertically "jackknifes" in transition between a level surface and a steep ramp to a loading dock. If the hangers are not removed they may be broken, or may be bent to a degree allowing the mud flaps to drag on the tires.

Because of these and other problems, most cantilever-type mud flap hangers are constructed so that they can be removed when conditions which might give rise to damage to the hangers or mud flaps are anticipated, and so that they can later be reinstalled.

It has heretofore been necessary, however, for an operator to get in behind the wheels at which such removable mud guards are positioned, and often to get under truck structures, to effect disengagement of the hanger, for example to unbolt it or knock it loose. The operator must again get in behind the wheels or under the structure to reengage the hanger. Removing and replacing hangers in this manner is often a disagreeable and difficult task, as the mud guard, wheels and adjacent vehicle structure may be wet or covered with mud, snow or ice. More importantly, the operator may be injured in such an operation if the vehicle accidentally moves. Understandably, operators very often fail to remove the mud guards when they should be and the hangers and mud flaps are consequently damaged or lost and must be replaced.

Furthermore, in normal highway use, where mud flaps are required, cantilevered mud flap hangers are subject to continual up and down flexing at or near the vehicle attachment point, caused by the outhanging weight of the mud flap and the bouncing and pitching of the vehicle to which they are attached. When inner ends of the hangers are rigidly attached to the vehicle or where there are 90° bends near the attachment point, such constant flexing rapidly causes metal fatigue and work hardening, with resultant breaking of the hanger often in only a very few months of service. Such breaking is very undesirable, not only because the lost hanger and mud flap must be replaced, but also because following vehicles may be hit by the falling hanger and mud flap or may cause an accident by swerving to miss a falling or fallen hanger and mud flap.

Some cantilever-type hangers are constructed having a helical spring portion adjacent to the vehicle attachment portion to partially absorb the vibrational flexing and to allow the hanger to "give" if it strikes or is struck by an obstruction. Producing such hangers is expensive, however, because special materials and heat treatment are required and, if the heat treatment is improper, the spring may be too weak and allow the mud flap to sag into contact with the wheels or the pavement, or the spring may be to brittle and break.

To the applicant's knowledge, no cantilevered mud flap hangers have heretofore been available which may be easily removed and reinstalled without an operator being required to get in behind wheels or under the vehicle to manually release or engage the hanger, which have near the attachment point, resilient regions for prolonging hanger life requiring no special materials or critical heat treating, and which are furthermore easy and economical to produce.

SUMMARY OF THE INVENTION

In carrying out principles of the invention according to a preferred embodiment, a quick release mud flap hanger assembly for trucks and trailers comprises a mud flap, a hanger having an outwardly projecting first leg and a depending second leg, means for connecting the mud flap to the first hanger leg and a support bracket adapted for mounting on a truck or trailer and for vertically supporting the second hanger leg with the mud flap disposed rearwardly of exposed wheels. A resilient portion, having a plurality of coplanar bends, each of less than 90°, interconnects the first and second hanger legs, vibrational flexing of the first leg relative to the second leg being divided among these bends to greatly extend hanger life. Pressure responsive means are provided in the second hanger leg to maintain that leg in a support bracket guideway against accidental release therefrom, and to allow installation and removal of the second leg into and from the guideway by forces applied solely to the first hanger leg.

The pressure responsive means includes a detent element which is movable between a first position wherein it is completely depressed into the second leg and a second position wherein portions thereof project outwardly beyond the surface of the second leg. The detent element, normally biased to the second position, cooperates with portions of the guideway to prevent accidental disengagement of the second leg therefrom. Portions of the guide exert inwardly directed forces on the detent element to move it to the second position to allow release of the second leg from, or its insertion into, the guideway solely in response to vertical forces applied to the first leg.

Additional bends may be formed in the resilient portion to offset the first leg rearwardly from the second leg, thereby providing for installation of the hanger on vehicles having mounting structures terminating forwardly of the required mud flap position.

A quick release mud guard is provided which is easy to remove from, and install on, a vehicle without the necessity for an operator getting in behind the vehicle's wheels or under its structure, which has a hanger with a greatly extended life, and which is economical and easy to produce.

DESCRIPTION OF THE DRAWINGS

FIG. 4 is a partial vertical sectional view along line 4—4 of FIG. 2;

FIG. 5 is a cross-sectional view along line 5—5 of FIG. 2;

FIG. 6 is a partial rear elevational view of a mud flap hanger having three bends in the resilient portion;

FIG. 7 is a plan view showing a second variation of the mud flap hanger having offset legs; and FIG. 8 is a partial rear elevational view of the hanger of FIG. 7.

DESCRIPTION OF THE PREFERRED EMBODIMENT

Figure 1:
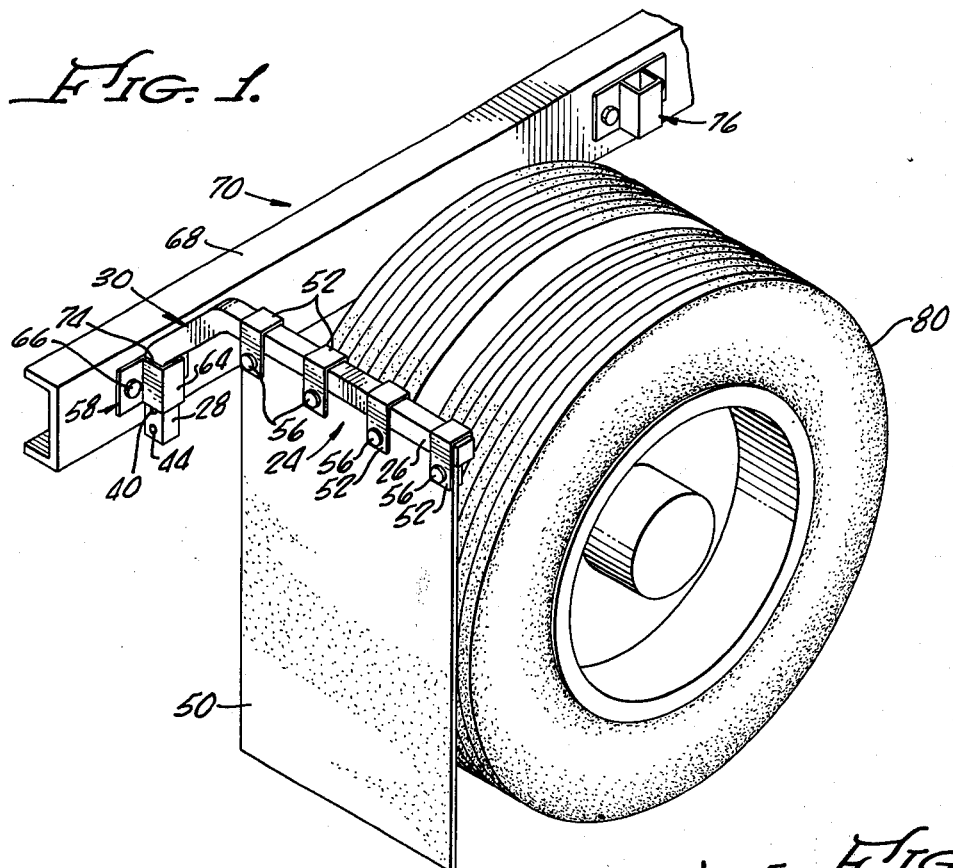
FIG. 1 is a perspective view of a mud flap hanger assembly, incorporating principles of the present invention, installed at the rear of a truck or trailer.
Figure 2:
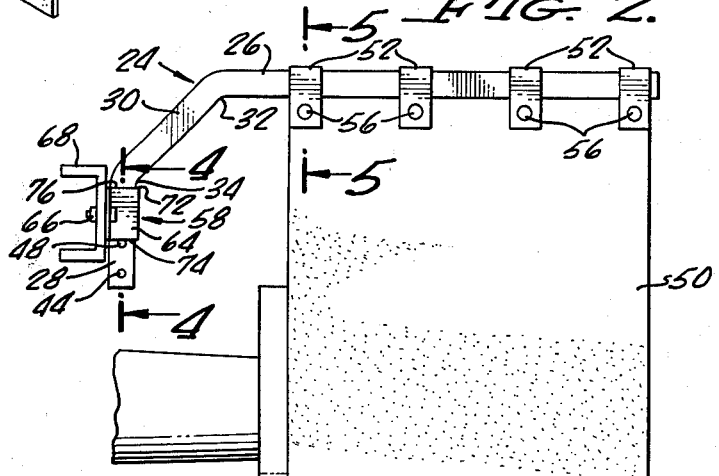
FIG. 2 is a rear elevational view of the mud flap hanger of FIG. 1.
Figure 3:
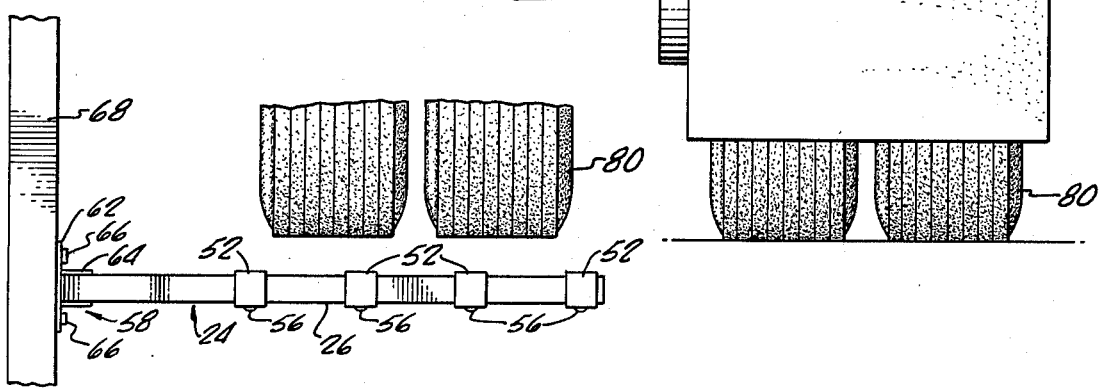
FIG. 3 is a plan view of the mud flap hanger of FIG. 1.

Referring to FIGS. 1, 2 and 3, a mud flap hanger 24 is formed from a metallic bar to have an elongate, outwardly projecting first leg 26 and a shorter, depending second leg 28 at right angles thereto. Intermediate the first and second legs 26 and 28, is a resilient portion 30 which interconnects such legs, with the longitudinal axes of the legs and the resilient portion in a common plane.

A plurality of coplanar bends, each of less than 90°, are formed in the resilient region. The vibrational bending of the first leg 26 relative to the second leg 28 is divided among such bends to reduce metal fatigue and work hardening, thereby greatly extending hanger life over that, for example, of a hanger having only a single 90° bend. A first bend 32, of about 45°, is formed adjacent to the inner end of the first leg 26 and a second bend 34, also of about 45°, is formed adjacent to the upper end of the second leg 28. In this manner, a generally L-shaped hanger is formed, the first leg 26 forming the longer portion of the L and the second leg 28 forming the shorter portion. Preferably, for reasons which will become apparent, the bar from which the hanger is formed has a square cross-section.

As best seen in FIG. 4, an aperture 36 is formed partially through a lower portion of the second leg 28, having an axis substantially perpendicular to the plane of the hanger. Pressure responsive locking means are formed, comprising a helical spring or biasing element 38 installed first in the aperture 36, and a spherical ball or detent element 40 installed outwardly therefrom and causing compression of the spring. A reduced diameter lip region 42 is formed (as by peening) around the opening of the aperture 36 to retain the ball 40 and spring 38 therein. The size of the lip region 42 allows a portion of the ball to project outwardly from the aperture and beyond the surface of the second leg 28 under the action of the spring 38. An inwardly directed force of predetermined magnitude on the projecting portion of the ball 40 causes further compression of the spring 38 and complete depressing of the ball into the aperture 36. Although the aperture 36 is shown opening rearwardly, it may alternatively open forwardly or outwardly.

A second aperture 44 may be formed through the second leg 28, below and parallel to the aperture 36, so that a padlock or other locking element (not shown) may, if desired, be used to lock the hanger 24 to a vehicle, as described below.

A mud flap 50, which may be a commercially available mud flap, is suspended from the first leg 26 of the hanger 24 by several clips 52, four being shown (FIGS. 1, 2 and 5). The clips 52, bent from a flat strip to fit around the cross-section of the first leg 26, have depending ends 54, the rearward of which is an extension of the back side of the clip. The ends 54 are spaced apart about the thickness of the mud flap 50, the upper edge of which is sandwiched therebetween. Fasteners 56, for example rivets or nuts and bolts, secure the mud flap 50 to the clips 52. The outermost of the clips 52 is preferably fixed to the first leg 26 near the outer end thereof, the remaining clips being free to slide along the first leg so they may be positioned at existing mounting holes in the mud flap 50.

A support bracket 58 is provided for releasably attaching the hanger 24 and the mud flap 50 to a vehicle. As best seen in FIGS. 2 and 4, the bracket 58 comprises a rigid rectangular plate 62, to the outer surface of which is attached, along a vertical center line, a guideway 64 which may be a channel or a tube having a square cross-section. Alternatively, the entire bracket 58 may be bent from a sheet to comprise a flanged channel which opens inwardly.

The plate 62 is adapted for mounting by a plurality of bolts 66 (two shown) to a frame member 68 of a truck or trailer (a rear portion of which is identified by the reference number 70 in FIG. 1). The bracket 58 is mounted so that the long axis of the guideway 64 is substantially vertical when the vehicle upon which the bracket is mounted is on a level surface.

The inside cross-sectional dimensions of the guideway 64 mate with the cross-sectional dimensions of the second hanger leg 28, allowing a snug sliding fit of the second leg therewithin. The length of the guideway 64, relative to the positioning of the aperture 36 of the second leg 28, is preferably such that when the second leg is fully installed in the guideway (that is, when the second bend 34 contacts an upper forward edge 72 of the guideway), approximately the upper quarter of the aperture is still within the guideway. Stated otherwise, when the second leg 28 is fully installed into the guideway 64, the upper portion of the ball 40 is in contact with a lower edge or corner 74 of the guideway, thereby causing the ball to remain partially, but not fully, depressed into the aperture 36. This is for ease in removal of the hanger 24, as will be more particularly described below.

For the convenience of the operator, a second support bracket 76, similar to the bracket 58, may be installed in another location on the frame member 68, for example forwardly of the bracket 58. The bracket 76 is installed in an easily accessible location so that the hanger 24 may, after its removal from the bracket 58, be stored therein, parallel to the frame member 68 where it is not exposed to damage.

Operation

The bracket 58 is attached, by the bolts 66, to the frame member 68 in such location that with the hanger 24 installed therein, the mud flap 50 is properly positioned behind wheels 80 to intercept mud, water spray, etc., thrown rearwardly thereby (FIG. 1). The hanger 24 is not, however, fixed to the bracket 58 or to the frame member 68, but may easily be removed from the bracket and later reinstalled therein in the manner described below.

Assume first that the hanger 24 is to be installed in the bracket 58. The operator easily does so by grasping the first leg 26 at any convenient location along its length, for example, towards the outer end thereof so that he is clear of the wheels behind which the mud guard is to be installed. With the hanger 24 positioned at right angles to the longitudinal axis of the vehicle, the lower end of the second leg 28 is inserted downwardly into the upper end of the guideway 64 until the protruding portion of the ball 40 contacts an upper inner edge or corner 82 of the guideway. The operator then presses firmly downwardly on the first leg 26, grasping the leg in such manner that the second leg is forced vertically further into the guideway 64 without twisting or binding. It is thus generally necessary to grasp the first leg with both hands and exert a moment thereon. A sufficiently great downwardly directed force on the first leg 26 causes the guideway edge 82 to exert an inwardly directed force on the ball 40 to depress it into the aperture 36, thereby allowing the second leg 28 to be slidably received into the guideway until the second bend 34 contacts the guideway edge 72. The ball 40 will then be in contact with the edge 74 and is prevented from being forced by the spring 38 to its most protruding position. Although the ball 40 protrudes sufficiently far to prevent accidental release of the second leg 28 from the guideway 64, for example by vibrational forces which might otherwise cause the second leg to "walk" up and out of the guideway, it is in such condition that the second leg may be easily removed from the guideway in the manner set forth below.

To remove the second leg 28 from the guideway 64, the first leg 26 is grasped and lifted sharply, it being generally necessary to apply a moment to the first leg to prevent binding of the leg 28 in the guideway 64. A sufficiently great upwardly directed force on the first leg 26 causes the lower guideway edge 74 to fully depress the ball 40 into the aperture 36, thereby releasing the leg 28 from the guideway 64. Since the ball 40 was initially depressed slightly into the aperture by the edge 74, release is effected with less force than would be required if the ball protruded its full amount.

The resilient portion 30 is constructed rigidly enough that such described installation and removal may be effected without substantial flexing between the legs 26, 28.

It is emphasized that an operator may, by the means described, install the hanger 24 into, and remove the hanger from, the bracket 58 without any necessity for manually contacting the second leg 28 or any portion of the bracket 58 to cause engagement or release of the hanger. The described installation and removal operations are instead easily, quickly and safely performed merely by grasping and depressing or lifting the outwardly protruding first hanger leg 26.

An operator may, at his discretion to prevent theft, choose to lock an installed hanger 24 in the bracket 58 by means of a padlock, the hasp of which is passed through the aperture 44 which is provided in the second leg 28 for this purpose. To do so, the operator must gain access to the second leg 28 to install and remove the lock, but such locking is not routinely performed and is unnecessary for retaining the hanger 24 in the bracket 58.

In some instances, an operator may choose to temporarily store a removed hanger 24 in the second bracket 76 provided for such purpose and for the operator's convenience. When such storing is accomplished, the hanger 24 is installed parallel to the longitudinal axis of the vehicle along the frame member 68, and not in an exposed position. A major reason for constructing the second leg 28 with a square cross-section is so that the two brackets 76 and 58 may be identical. Although it is necessary for an operator to be positioned near the frame to install the hanger 24 into, and remove it from, the bracket 76, such hanger storage is optional and need not be used if inconvenient to do so.

Thus, in making provision for locking the hanger 24 into the bracket 58 or for storing it in the bracket 76, there is no intent to detract from the advantageous features of the invention which allows easy installation and removal of the hanger into and from the bracket 58 from a position remote from the bracket.

The following approximate dimensions and values are given by way of example and illustration, no limitation being thereby intended.

The hanger 24 may be formed from a ¾ inch square steel or aluminum bar. When formed in the manner described, the outer end of the first leg 26 may project outwardly 30 inches from the bracket 58 and the lower end of the second leg 28 may extend 6 inches below the first leg. The aperture 40 may be five-eighths inches deep. The clips 52 may be 2 inches wide, having ends 54 which are 1 inch long. The guideway 64 is 2 inches high.

It has been determined that the diameter of the ball 40 and the compressive force of the spring 38 are important for secure retention of the second leg 28 in the guideway 64 against vibrational forces and for easy insertion and removal of the second leg into, and from, the guideway by means of the first leg 26. If the diameter of the ball 40 is too small and/or the compressive force of the spring 38 is too weak, the second leg 28 may walk out of the guideway 64 under the vibration encountered in use, and the hanger will be lost. However, if the diameter of the ball 40 is too large and/or the compressive force of the spring 38 is too strong, the second leg 28, while being prevented from walking out of the guideway 64 in use, cannot easily be removed or installed solely by forces applied to the first leg 26.

Assuming a hanger 24 having a ¾ inch square cross-section, the ball 40 is preferably five-sixteenths inch in diameter. The spring 38 is preferably made of 0.030 inch diameter stainless steel and is one-half inch long, requiring approximately 20 pounds to compress. The scope of the invention is not, however, limited to such stated dimensions and spring compression values, it being possible to achieve the described benefits using different dimensions and spring compressions, particularly if more than one detent element is employed or if differently shaped detent elements are used.

DESCRIPTION OF THE FIRST VARIATION OF FIG. 6

Other bend configurations may be employed in the resilient portion 30 to reduce work hardening and extend hanger life. One such variation employing three bends of less than 90° has been determined to be effective and is illustrated in FIG. 6. For purposes of description, elements and features identical to those previously described will be identified by the original reference numbers. Comparable elements and features will be identified by the original reference numbers followed by the letter a and new or previously undescribed elements and features will be identified by reference numbers in the 100 series.

A planar hanger 24a is formed having the same overall dimensions and same general L-shape as the hanger 24 described above, and has an outwardly projecting first leg 26a and a depending second leg 28a interconnected by an intermediate resilient portion 30a. Three coplanar bends are formed in the resilient region 30a: A first bend 102 adjacent to the inner end of the first leg 26a; a second bend 104 adjacent to the upper end of the second leg 28a, and a third bend 106 intermediate the bends 102 and 104. The first and second bends 102 and 104 have substantially the same angle of bend, which is somewhat greater than 45° and much less than 90°, both such bends opening generally downwardly and outwardly. The third bend 106, which opens in a direction generally opposite to the bends 102 and 104, is generally arcuate and is less than 45°.

The mud flap 50 is suspended from the first leg 26a in the same manner as described above for the hanger 24. The detent element 40 and spring element 38 are also installed in the second leg 28a in the described manner. The operation of such hanger 24a is also as described, the same beneficial features being present.

DESCRIPTION OF THE SECOND VARIATION OF FIGS. 7 AND 8

Frames or structures of some vehicles, for example many truck tractors or "semis," terminate near or forwardly of the back of the rear wheels. Mud flap hangers which project directly outwardly cannot be used on such vehicles because the mud flaps, if not the hangers, would contact the wheels and be quickly destroyed. It is generally not feasible merely to angle the hanger rearwardly because, unless such angling were very small, the mud flap would be too close to the wheels in some regions and too far away in others.

Accordingly, and as illustrated in FIGS. 7 and 8, a hanger having the first leg offset rearwardly from the second leg is constructed for use on such vehicles. For purposes of description, elements and features identical to those previously described will be identified by the original reference numbers. Comparable elements and features will be identified by the original reference numbers followed by the letter b. New elements and features will be identified by reference numbers in the 200 series.

A hanger 24b is constructed having an outwardly projecting first leg 26b and a depending second leg 28b interconnected by a resilient portion 30b having coplanar bends 32b and 34b. The mud flap 50 is suspended from the first leg 26b and the second leg 28b is received into the guideway 64 of the bracket 58.

Two additional bends are formed in the resilient portion 30b to offset or jog the first leg 26b rearwardly from the second leg 28b. A first additional bend 202, opening generally rearwardly and inwardly, is formed intermediate the bends 32b and 34b, and a second additional bend 204, opening generally outwardly and forwardly, is formed outwardly of the bend 32b, each of the four bends being approximately equally spaced.

Other than the two bends 202 and 204 formed to offset the first leg 26b rearwardly from the second leg 28b, the hanger 24b is substantially identical with the previously described hanger 24. The operation thereof is as described above, except that the bracket 58 is installed forwardly of the position of the mud flap 50, the rearward offsetting of the first leg 26b causing the mud flap to be properly disposed behind the vehicle's wheels.

It is to be understood that the foregoing description and examples are for illustrative purposes and no limitations are thereby intended, the scope of the invention being limited solely by the appended claims.

I claim:

1. A mud flap hanger assembly for trucks and trailers, comprising:
    a. a mud flap,
    b. hanger means for supporting said mud flap,
        said hanger means including a hanger having a first leg,
        a second leg extending substantially perpendicularly thereto, and a resilient portion interconnecting said first and second legs,
        said resilient portion including a plurality of coplanar bends, each of said bends being less than about 90°,
    c. connecting means for connecting said mud flap to said first leg, and
    d. support means, adapted for mounting on the frame of a truck or trailer, for supporting said second leg with said mud flap disposed rearwardly of wheels of said truck or trailer whereby to intercept material rearwardly thrown therefrom.

2. The mud flap hanger assembly of claim 1, wherein said plurality of bends includes two bends, each of about 45° and each opening in the same general direction, one of said two bends being adjacent an inner end of said first leg and the other of said two bends being adjacent an upper end of said second leg.

3. The mud flap hanger assembly of claim 1, wherein said plurality of said bends includes two bends each having substantially the same angle of bend and a third bend having a smaller angle of bend, a first of said two bends being adjacent an inner end of said first leg and a second of said two bends being adjacent an upper end of said second leg, said third bend being intermediate said first and second bends, each of said two bends being greater than about 45° and opening in one general direction and said third bend being less than about 45° and opening generally in an opposite direction.

4. The mud flap hanger assembly of claim 1, wherein said support means includes receiving means for slidably receiving said second leg and wherein said second leg includes pressure responsive means for releasably retaining said second leg in said receiving means.

5. The mud flap hanger assembly of claim 1, wherein said connecting means includes plural clips formed to fit around the cross-section of said first leg, said clips having depending ends for mounting said mud flap therebetween, the outermost of said clips being fixed to said first leg adjacent the outer end thereof, the others of said clips being slidable along said first leg.

6. The mud flap hanger assembly of claim 1 further including second support means, adapted for mounting on a truck or trailer frame, for storing said hanger means in a position other than behind wheels thereof, said second support means including means for receiving said second leg.

7. The mud flap hanger assembly of claim 1, including offsetting means for offsetting said first leg rearwardly from said second leg, said offsetting means comprising plural non-planar bends in said resilient portion, are of said non-planar bends being adjacent to an inner end of said first leg and a second of said non-planar bends being adjacent to an upper end of said second leg.

8. A mud flap hanger assembly for trucks and trailers, comprising:
   a. a mud flap,
   b. hanger means for supporting said mud flap,
      said hanger means including a hanger having a first leg, a second leg extending substantially perpendicularly thereto, and a resilient portion interconnecting said first and second legs,
      said resilient portion including a plurality of co-planar bends, each of said bends being less than about 90°,
   c. connecting means for connecting said mud flap to said first leg, and
   d. support means, adapted for mounting on the frame of a truck or trailer, for supporting said second leg with said mud flap disposed rearwardly of wheels of said truck or trailer whereby to intercept material rearwardly thrown therefrom, said support means including receiving means for slidably receiving said second leg and wherein said second leg includes pressure responsive means for releasably retaining said second leg in said receiving means, said pressure responsive means including an aperture formed in said second leg, a detent element mounted in said aperture for movement between a first position, wherein said detent element is wholly within said aperture and a second position wherein said detent element projects at least partially from said aperture, means for limiting movement of said detent element to and between said first and second positions, and biasing means for urging said detent element towards said second position.

9. The mud flap hanger assembly of claim 8, wherein said detent element comprises a spherical ball and said biasing means comprises a helical compression spring.

10. The mud flap hanger assembly of claim 9, wherein said spherical ball has a diameter of approximately five-sixteenths inch and wherein said spring requires a force of approximately 20 pounds to allow movement of said ball from said second position to said first position.

11. The mud flap hanger assembly of claim 9, wherein at least major portions of said aperture are positioned to be below said receiving means when said second leg is fully received therein, portions of said receiving means causing said detent element to be moved to said first position when said second leg is inserted thereinto and said first leg is pushed downwardly, thereby allowing insertion of said second leg into said receiving means, other portions of said receiving means causing said detent element to be moved to said first position when said second leg has been fully inserted into said receiving means and when said first leg is lifted upwardly, thereby allowing withdrawal of said second leg from said receiving means.

12. A mud flap hanger assembly comprising:
   a. bracket means adapted to be fixed to a vehicle frame for providing an upwardly extended guideway having a predetermined cross-sectional configuration,
   b. a hanger having an outwardly projecting first leg and a depending second leg,
      said first leg being adapted to support a mud flap, said second leg having a cross-sectional configuration that mates with said predetermined cross-sectional configuration of said guideway, said depending leg being adapted to be slidably received and withdrawn from said guideway, and
   c. retaining means for exerting a restraint of predetermined magnitude against motion of said second leg from said guideway, said magnitude being within a range of magnitude having a minimum sufficient to prevent accidental withdrawal of said second leg from said guideway in the presence of vibrations of vehicle motion and having a maximum not greater than a force exerted by an operator to manually withdraw said second leg from said guideway, said restraining means including a retractable detent element and a biasing means for outwardly biasing said detent element mounted in an aperture in said second leg and means for retaining said detent element and said biasing means within said second leg while allowing a portion of said detent element to project outwardly therefrom.

13. The assembly of claim 12, wherein said detent element is a spherical ball about five-sixteenths inch in diameter and said biasing means includes a helical spring requiring about 20 pounds to allow said retraction of said detent element into said aperture.

* * * * *

UNITED STATES PATENT AND TRADEMARK OFFICE
CERTIFICATE OF CORRECTION

PATENT NO. : 3,934,901
DATED : January 27, 1976
INVENTOR(S) : Robert C. Hammerly It is certified that error appears in the above–identified patent and that said Letters Patent are hereby corrected as shown below:

Column 9, line 11, first word "are" should be ---one---.

Signed and Sealed this fourth Day of May 1976

[SEAL]

Attest:

RUTH C. MASON
*Attesting Officer*

C. MARSHALL DANN
*Commissioner of Patents and Trademarks*